United States Patent
Moeller

(10) Patent No.: US 8,210,974 B2
(45) Date of Patent: Jul. 3, 2012

(54) HUBS INCORPORATING A VARIABLE RATIO TRANSMISSION SYSTEM

(75) Inventor: Frank Moeller, Oun (GB)

(73) Assignee: Nexxtdrive Limited, London (GB)

(*) Notice: Subject to any disclaimer, the term of this patent is extended or adjusted under 35 U.S.C. 154(b) by 816 days.

(21) Appl. No.: 11/663,616

(22) PCT Filed: Sep. 27, 2005

(86) PCT No.: PCT/GB2005/003710
§ 371 (c)(1),
(2), (4) Date: Apr. 10, 2009

(87) PCT Pub. No.: WO2006/035215
PCT Pub. Date: Apr. 6, 2006

(65) Prior Publication Data
US 2009/0305831 A1    Dec. 10, 2009

(30) Foreign Application Priority Data
Sep. 29, 2004 (EP) .................................. 04256002

(51) Int. Cl.
*B60L 11/14* (2006.01)
(52) U.S. Cl. ............................ 475/5; 180/65.51; 475/149
(58) Field of Classification Search .............. 475/5, 149, 475/150; 180/65.51, 65.1, 65.6
See application file for complete search history.

(56) References Cited

U.S. PATENT DOCUMENTS

| | | | | |
|---|---|---|---|---|
| 3,812,928 A | * | 5/1974 | Rockwell et al. .......... | 180/65.51 |
| 3,892,300 A | * | 7/1975 | Hapeman et al. .......... | 180/65.51 |
| 3,897,843 A | * | 8/1975 | Hapeman et al. .......... | 180/65.51 |
| 4,274,023 A | * | 6/1981 | Lamprey ..................... | 310/83 |
| 4,346,777 A | * | 8/1982 | Restelli ....................... | 180/220 |
| 4,930,590 A | * | 6/1990 | Love et al. .................. | 180/55 |
| 5,087,229 A | * | 2/1992 | Hewko et al. ............... | 475/149 |
| 5,293,089 A | * | 3/1994 | Frister ......................... | 310/54 |
| 5,382,854 A | * | 1/1995 | Kawamoto et al. ......... | 310/67 R |
| 5,472,059 A | * | 12/1995 | Schlosser et al. .......... | 180/65.51 |
| 5,633,544 A | * | 5/1997 | Toida et al. ................. | 310/67 R |

(Continued)

FOREIGN PATENT DOCUMENTS
EP    0 980 821    2/2000
(Continued)

*Primary Examiner* — Jeffrey J Restifo
(74) *Attorney, Agent, or Firm* — Cowan, Liebowitz & Latman

(57) ABSTRACT

A hub comprises a cylindrical, hollow hub member (2), which is mounted to rotate about its axis and in whose interior is a transmission system having an input (10), which is mounted to rotate about the axis, and an output connected to rotate with the hub member. The transmission system comprises first and second epicyclic gearsets (14, 16). The first gearset (14) comprises a first sun gear (18), which is mounted to rotate about the axis and is in mesh with a plurality of first planet gears (20) mounted to rotate about respective planet shafts (22) carried by a first common carrier (24), which is mounted to rotate about the first axis. The second gearset (16) comprises a second sun gear (28), which is mounted to rotate about the axis and is in mesh with a plurality of second planet gears (30) mounted to rotate about respective planet shafts (32) carried by a second common carrier (34). The first and second sun gears (18, 28) are connected to the rotors (38, 40) of first and second electric motor/generators, respectively. The power connections of the two stators (42, 46) are connected via a controller (50) arranged to control the transmission of power from one motor/generator to the other.

18 Claims, 6 Drawing Sheets

U.S. PATENT DOCUMENTS

| | | | |
|---|---|---|---|
| 5,691,584 A * | 11/1997 | Toida et al. | 310/67 R |
| 5,763,980 A * | 6/1998 | Li | 310/323.03 |
| 5,793,132 A * | 8/1998 | Hirose et al. | 310/71 |
| 5,941,333 A * | 8/1999 | Sun et al. | 180/206.4 |
| 6,007,447 A * | 12/1999 | Lin | 475/149 |
| 6,012,538 A * | 1/2000 | Sonobe et al. | 180/220 |
| 6,100,615 A * | 8/2000 | Birkestrand | 310/75 C |
| 6,276,475 B1 * | 8/2001 | Nakanosono | 180/65.8 |
| 6,296,072 B1 | 10/2001 | Turner | 180/220 |
| 6,328,123 B1 * | 12/2001 | Niemann et al. | 180/65.51 |
| 6,355,996 B1 * | 3/2002 | Birkestrand | 310/54 |
| 6,386,553 B2 * | 5/2002 | Zetterstrom | 280/5.51 |
| 6,722,459 B1 * | 4/2004 | Wendl et al. | 180/65.51 |
| 6,749,532 B2 * | 6/2004 | Wachauer | 475/5 |
| 6,752,227 B1 * | 6/2004 | Bachmann | 180/65.51 |
| 6,893,371 B2 * | 5/2005 | Mills et al. | 475/149 |
| 6,974,399 B2 * | 12/2005 | Lo | 475/5 |
| 7,186,197 B2 * | 3/2007 | Zordan | 475/5 |
| 7,214,155 B2 * | 5/2007 | Mueller et al. | 475/5 |
| 7,315,099 B2 * | 1/2008 | Steffen et al. | 310/54 |
| 7,350,606 B2 * | 4/2008 | Brill et al. | 180/65.51 |
| 7,357,743 B2 * | 4/2008 | Mao et al. | 475/5 |
| 7,410,017 B2 * | 8/2008 | Gradu | 180/65.6 |
| 7,452,297 B2 * | 11/2008 | Miller et al. | 475/5 |
| 7,455,611 B2 * | 11/2008 | Miller et al. | 475/5 |
| 7,462,123 B2 * | 12/2008 | Miller et al. | 475/5 |
| 7,527,113 B2 * | 5/2009 | Jenkins | 180/65.51 |
| 7,686,726 B2 * | 3/2010 | Thompson | 475/150 |
| 7,717,203 B2 * | 5/2010 | Yoshino et al. | 180/65.51 |
| 7,749,121 B2 * | 7/2010 | Perng | 475/5 |
| 7,766,779 B2 * | 8/2010 | Belmont | 475/5 |
| 7,828,095 B2 * | 11/2010 | Murata et al. | 180/65.51 |
| 7,866,423 B2 * | 1/2011 | Ruppert et al. | 180/65.1 |
| 8,100,208 B2 * | 1/2012 | Jordan | 180/65.51 |
| 2003/0015360 A1 | 1/2003 | Villeneuve | |

FOREIGN PATENT DOCUMENTS

| | | |
|---|---|---|
| GB | 2 398 108 | 8/2004 |
| JP | 56-120826 | 9/1981 |
| JP | 2000-211574 A | 8/2000 |
| JP | 2002-274201 A | 9/2002 |
| WO | 2004/072449 | 8/2004 |

* cited by examiner

HUBS INCORPORATING A VARIABLE RATIO TRANSMISSION SYSTEM

CROSS-REFERENCES TO RELATED APPLICATIONS

This application claims priority to International Application No. PCT/GB2005/003710 filed Sep. 27, 2005, which claims priority to European Patent No. 04256002.9 filed Sep. 29, 2004, the entire disclosures of which are hereby incorporated by reference.

BACKGROUND OF THE INVENTION

The present invention relates to hubs, particularly though not exclusively hubs for or incorporated in vehicle wheels, particularly bicycle wheels or motorcycle wheels but also wheels for vehicles with three or more wheels, and is concerned with that type of hub which incorporates a variable ratio transmission system.

Bicycle wheels are known with a hub which incorporates a variable ratio transmission system but this transmission system can only provide a relatively small number of discrete gear ratios. It would be desirable to provide a bicycle wheel with a hub incorporating a transmission system of continuously variable ratio.

There is an ever increasing social and legislative pressure on the manufacturers of motor vehicles to provide engines with a reduced fuel consumption and thus reduced emission of pollutants. One way of achieving these aims is to ensure that the transmission system of the vehicle always uses the optimum gear ratio and this can only be achieved by providing that the transmission system is of continuously or steplessly variable type and thus has an infinite number of gear ratios. One of the results of the pressure referred to above to reduce the fuel consumption and thus the emission of pollutants from engines is that vehicles of so called hybrid type are rapidly increasing in popularity. There is therefore also a need for a transmission system which can simply combine both a mechanical power input and an electrical power input into a single mechanical power output.

It is the object of the present invention to provide a hub incorporating a variable ratio transmission system which fulfils all of the above requirements.

BRIEF DESCRIPTION

According to the present invention, a hub comprises a substantially cylindrical, hollow hub member, which is mounted to rotate about its axis and accommodated in whose interior is a transmission system having an input, which is mounted to rotate about the axis, and an output connected to rotate with the hub member, the transmission system comprising first and second epicyclic gearsets, the first gearset comprising a first sun gear which is mounted to rotate about the axis and is in mesh with a plurality of first planet gears mounted to rotate about respective planet shafts carried by a first common carrier, which is mounted to rotate about the axis, the first planet gears being in mesh with a further gear element, the second gearset comprising a second sun gear, which is mounted to rotate about the axis and is in mesh with a plurality of second planet gears mounted to rotate about respective planets shafts carried by a second common carrier, the second planet gears being in mesh with a second annulus gear, the first planet gears or the first common carrier being connected to rotate in synchronism with the second planet gears or the second carrier, the first and second sun gears being connected to the rotors of first and second reversible machines, respectively, arranged to produce power or to act as motors, the power connections of the two stators being connected via a controller arranged to control the transmission of power from one machine to the other.

The transmission system incorporated in the hub in accordance with the present invention thus includes a cylindrical, hub member, which is mounted, in the usual manner, to rotate about its axis. Within its interior is a transmission system having a coaxial input and an output connected to the hub member, whereby rotation of the input results in rotation of the hub member. If the hub is a vehicle wheel hub, the hub member will be connected to the remainder of the wheel and the input will be connected to a sprocket wheel, pulley wheel or the like, which is mounted to rotate about the axis of the hub member and around which a chain, belt or the like passes to transmit input power to the hub. The hub could, however, also be part of, for instance, a winch or winding drum and in this event the hub member may simply carry side flanges to define the space on to which the rope, cable or the like is to be wound. The transmission system includes two epicyclic gearsets, each of which includes a sun gear, which is mounted to rotate about the axis, and a plurality of planet gears which are in mesh with the sun gear and are mounted to rotate about respective planet shafts carried by an associated common carrier. The two sets of planet gears are in mesh with a further gear element, which will be an annulus gear or a further sun gear. Either the planet gears or the common carrier of the first gearset are connected to rotate in synchronism with the planet gears or the common carrier of the second gearset. This connection may take many forms and if the two common carriers are connected together they will of course rotate at the same speed. If, however, the planet gears of the first gearset are in mesh with a further gear which is in turn either in mesh with the planet gears of the second gearset or is connected to rotate with the carrier of the second gearset, the two connected elements may rotate at the same speed or at a different speed but even if they rotate at a different speed they will still rotate in synchronism because the speeds of the two connected elements will necessarily be in a fixed ratio to one another. The two sun gears are connected to the rotors of first and second reversible machines, respectively, which are arranged to produce power or to act as motors. The power connections of the two stators are connected via a controller which is arranged to control the transmission of power from one machine to the other.

If the hub is for, or constitutes part of, a large piece of apparatus, such as winding drum or winch, the first and second reversible machines, may be hydraulic pumps/motors, one of which will generally act as a pump and will provide power in the form of pressurised hydraulic fluid to the other machine, which will act as a motor. If, however, the hub is for, or constitutes part of, a vehicle wheel, there is unlikely to be sufficient space for two reversible hydraulic machines and in this event it is preferred that the two machines constitute electric motor/generators. In use, one of the motor/generators generally acts as a generator and transmits electrical power to the other motor/generator, which acts as motor. The amount of electrical power so transmitted may be selectively varied by means of the controller thereby altering the transmission ratio of the transmission system. Power is transmitted through the transmission system both mechanically and electrically, in proportions which vary with the varying transmission ratio. The output speed of the transmission system, and thus the speed of the hub member, may thus be varied independently of the input speed, which means that the speed of the wheel or the like connected to the hub member in accordance with the invention may be varied independently of the speed of the engine or the pedals to which it is connected, which means in turn that it may be operated precisely at the speed which is the most appropriate for the driving conditions of the vehicle.

The input of the transmission system may be connected to rotate with the first common carrier but in an alternative embodiment the further gear element in the first epicyclic gearset is a third sun gear, which is mounted to rotate about the axis and is connected to rotate with the input. Alternatively, the further gear element maybe a first annulus gear connected to rotate with the hub member. The first annulus gear may be a separate component, which is connected to the hub member, but it is preferred that it constitutes an integral part of the hub member, e.g. a flange integral with the inner surface of the hub member, the inner circular surface of which the flange carries gear teeth.

The second common carrier may be connected to rotate with the hub member or alternatively the second annulus gear may be connected to rotate with the hub member.

In a further embodiment, the first and second common carriers are connected to rotate together. In a further embodiment, the second annulus gear is stationary.

The planet gears may constitute conventional, simple gears affording a single set of gear teeth which is in mesh with the associated sun gear and the associated annulus gear or third sun gear. It is, however, preferred that the gears of at least one and preferably both of the pluralities of planet gears are so called stepped gears consisting of two connected, preferably integrally connected, portions of different diameter, both of which carry gear teeth and one of which is in mesh with the associated sun gear and the other of which is in mesh with the associated annulus gear or third sun gear. Relatively high ratios of the two epicyclic gearsets are required if the hub is for use in the wheel of a bicycle or motorcycle and this feature results in a reduction in the required torque, and thus in the size of the two reversible machines and the diameter of the two gearsets. The overall diameter of the hub is thus reduced.

The hub may form part of the rear wheel of an electric bicycle or an electrically assisted bicycle or part of any wheel of an electrically powered or assisted vehicle, e.g. a hybrid vehicle, and in this event the controller will also be connected, in use, to an electric battery and will be arranged to control the flow of electric power between the two motor/generators and the battery. The electric motor/generators thus not only are the means by which the transmission ratio of the transmission system may be continuously varied but also the means by which electrical power from the battery may be converted into mechanical power and transmitted to the wheel. The motor/generators can also serve a dual function when the hub is for a wheel of a motor vehicle, such as a motorcycle, because one or both of the motor/generators may additionally fulfil the function not only of the conventional alternator, which is used to produce electric power to recharge the battery, but also the function of the conventional starter motor. A vehicle including a wheel with a hub in accordance with the present invention need therefore not be provided with the usual alternator and starter motor. The hub in accordance with the invention can also be incorporated in two wheels or even four wheels of a motor car and this will provide the possibility of controlling the speed of two or even all four wheels of a motor car independently, which will therefore permit the conventional differential to be omitted as well.

DETAILED DESCRIPTION

Further features and details of the invention will be apparent from the following description of four specific embodiments, which is given by way of example only with reference to the accompanying drawings, in which FIGS. 1 to 6 are diagrammatic, axial sectional views of six embodiments of hub in accordance with the invention, though the electrical components have been at least partially omitted from FIGS. 2 to 6 for reasons of simplicity.

Figure 1:
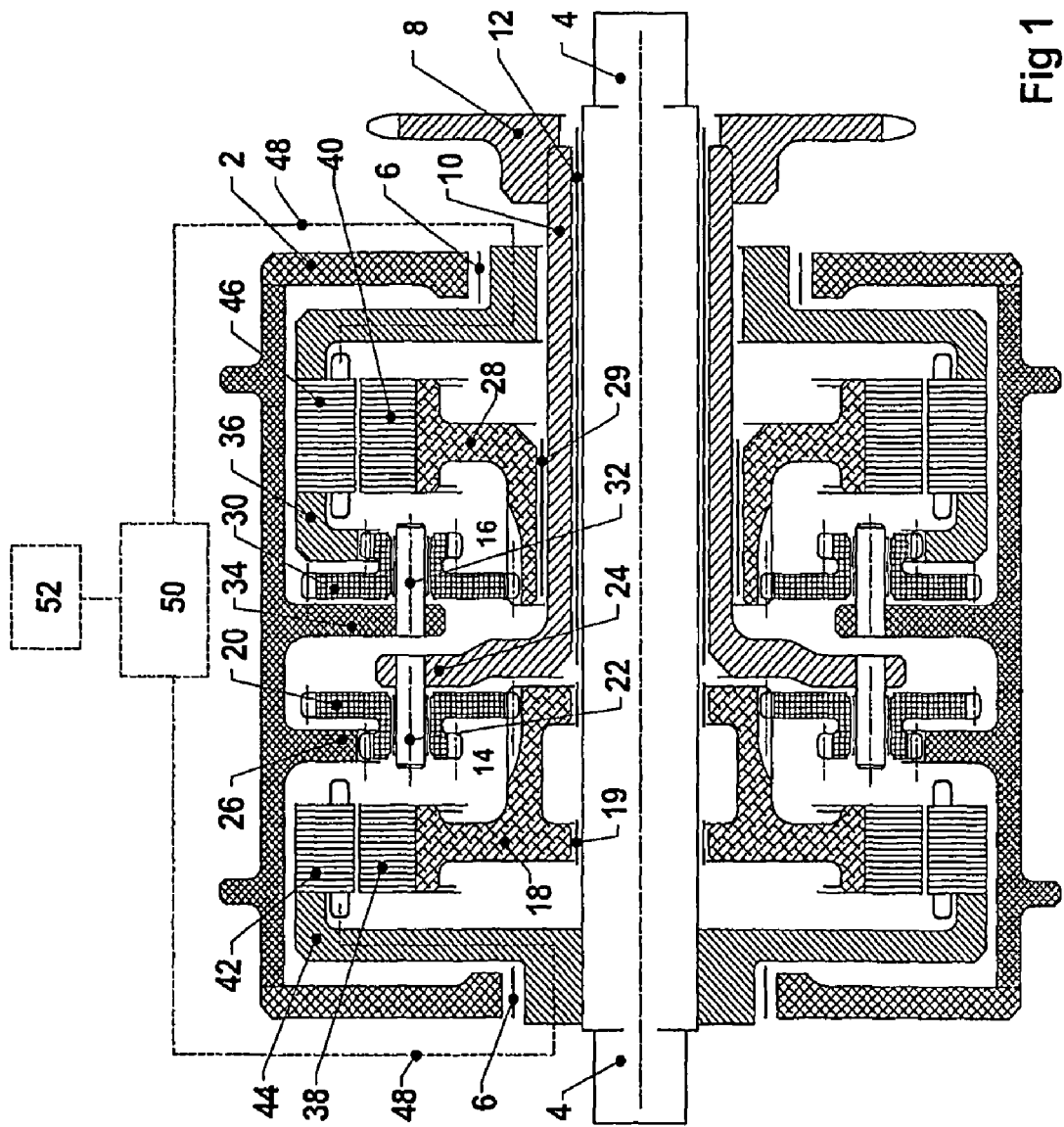
FIG. 1 is an axial sectional diagrammatic view of a first embodiment of this invention.

Referring firstly to FIG. 1, the hub includes a hollow cylindrical hub member 2, which is mounted to rotate about its axis on an axle 4 by means of bearings 6, which are shown only schematically. Mounted at one end of the shaft 4 for rotation about its axis is a sprocket wheel 8, around which, in use, a chain will pass. Connected to the sprocket wheel 8 is a tubular input shaft 10 which extends around the axle 4 and is mounted to rotate with respect to it by means of a bearing 12, which is again shown only schematically.

Accommodated within the interior of the hub member 2 is a transmission system including a first epicyclic gearset 14 and a second epicyclic gearset 16. The first epicyclic gearset 14 includes a first sun gear 18, which is mounted on bearings 19 to rotate about the axle 4 and is in mesh with a number of planet gears 20. The planet gears 20 are mounted to rotate about respective planet shafts 22, which are connected to a first common carrier 24. The carrier 24 is connected to rotate with the input shaft 10. The first planet gears 20 are of stepped type and include a portion of relatively large diameter, which carries gear teeth in mesh with the sun gear 18, and a portion of relatively small diameter, which carries gear teeth, which are in mesh with a first annulus gear 26. The annulus gear 26 is constituted by teeth on the annular inner surface of an internal flange integral with the hub member 2.

The second epicyclic gearset 16 includes a second sun gear 28, which is mounted to rotate on bearings 29 about the axle 4. It is in mesh with a number of second planet gears 30, which are mounted to rotate about respective planet shafts 32, which are in turn connected to a second common carrier 34. In this case, the carrier 34 constitutes a further internal flange integral with the hub member 2 and it therefore necessarily rotates with the hub 2. The second planet gears 30 are again of stepped type and it is the portion of larger diameter which is in mesh with the second sun gear 28. The portion of smaller diameter is in mesh with a second annulus gear 36, which is stationary. The first planet gears 20 rotate in synchronism with the second carrier 34, but at a different speed.

The first and second sun gears 18, 28 are connected to the rotors 38, 40, respectively, of first and second electric motor/generators. The stator 42 of the first motor/generator is carried by a stationary bracket 44. The stator 46 of the second motor/generator is connected to the stationary second annulus gear 36. The electrical connections of the two stators 42, 46 are shown schematically at 48 and are connected to a controller 50, which is also connected to an electric battery 52.

In use, the sprocket 8 is rotated by the chain which passes around it and this rotation is transmitted by the input shaft 10 to the carrier 24 of the first gearset. One of the two motor/generators generally acts as a generator and transmits electrical power to the other motor/generator, which then acts as a motor. The amount of electrical power which is transmitted between the two motor/generators is determined by the controller 50, typically in response to the engine management system of the vehicle to which the hub is fitted, and this determines the speed at which that motor/generator which is operating as a motor rotates and thus the transmission ratio of the transmission system. The speed of the output and thus of the hub member 2 may thus be varied independently of the input speed. In practice, most of the power transmitted by the transmission system is transmitted in a form of mechanical power rather than electrical power and power losses are therefore relatively small.

If the hub is fitted to an electrically assisted bicycle, the input power applied to the sprocket 8 will be applied by the user to the pedals of the bicycle. The controller may, however, be actuated to additionally supply electrical power from the battery 52 to one or other of the motor/generators to augment the power supplied by the user and thus assist the cyclist to, for instance, ride more easily up a hill. If, on the other hand, the hub forms part of a motorcycle, the battery may be used to provide additional power if the motorcycle is of hybrid type but if it is of conventional type the battery will generally be used only for its traditional purposes, that is to say starting, lighting and ignition. The motor/generators may, however, replace the conventional starter motor and the battery may be used to start the vehicle engine, when required and may be recharged via the controller at those times when electrical power is generated surplus to requirements. The transmission system can also operate very effectively as a brake and the action of braking will generate electricity which can be used to recharge the battery. The use of such regenerative breaking will increase the overall fuel efficiency of the motorcycle. Indeed, the controller can be operated to virtually lock the hub and the hub can therefore replace the brakes which are conventionally provided on motor vehicles.

Figure 2:
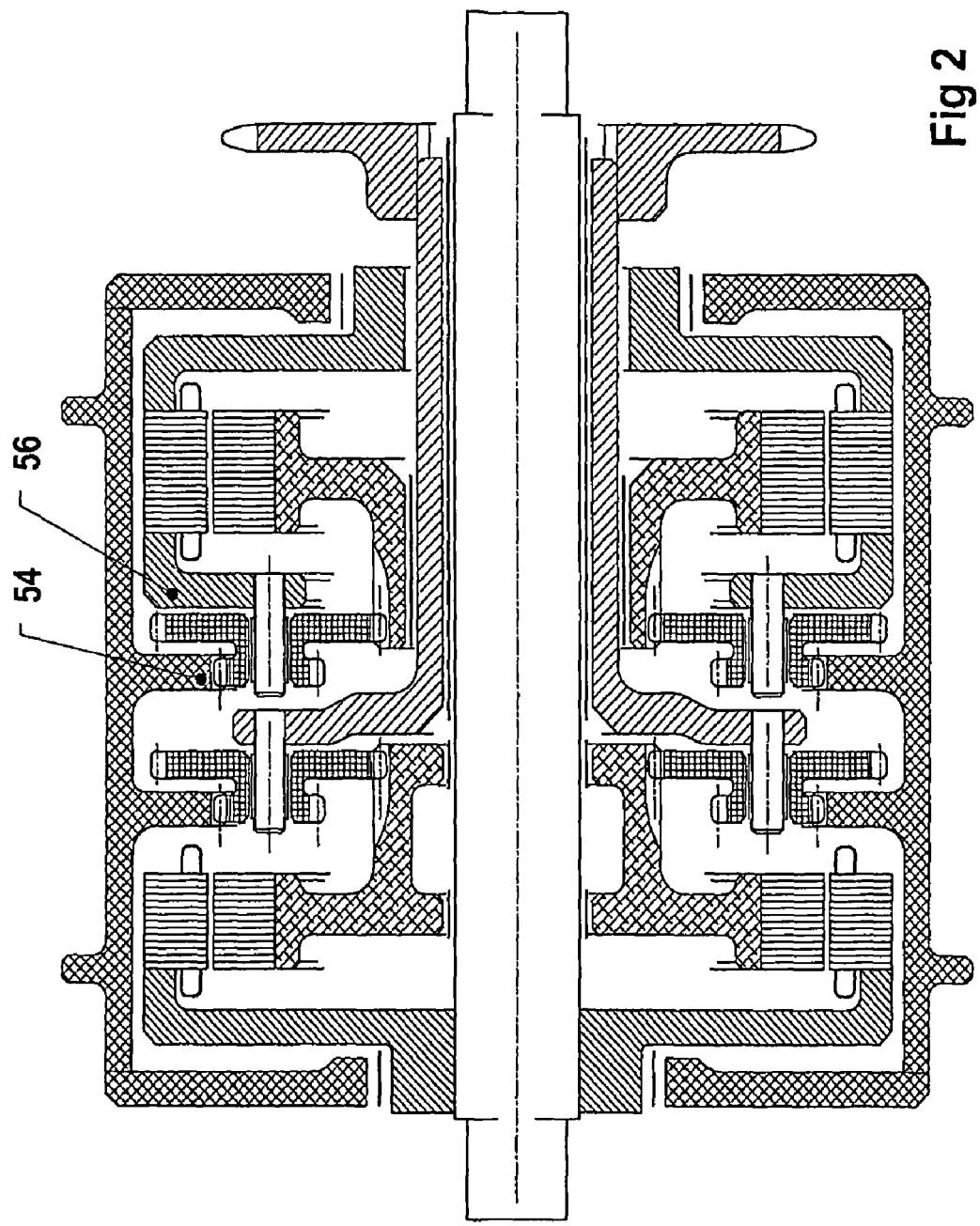
FIG. 2 is an axial sectional diagrammatic view of a second embodiment of this invention.
Figure 3:
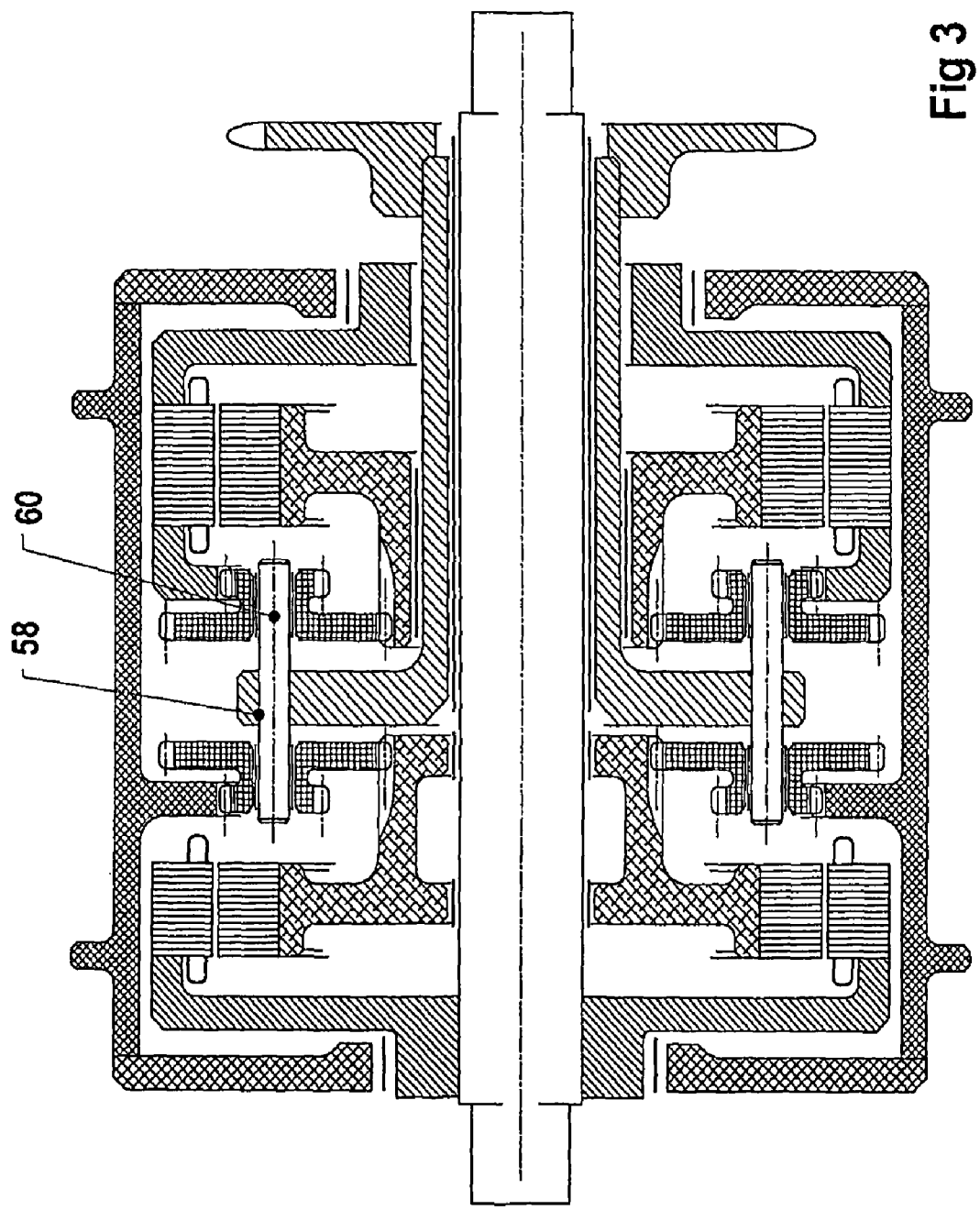
FIG. 3 is an axial sectional diagrammatic view of a third embodiment of this invention.

The embodiment of FIG. 2 is very similar to that of FIG. 1 and the only difference is that the hub member is not connected to the common carrier of the second gearset but instead affords a second integral annulus gear 54, which is in mesh with the smaller portions of the stepped planet gears 30. The common carrier 56 of the second gearset is in this case stationary and forms part of the bracket to which the stator 46 of the second motor/generator is connected. Thus in this embodiment, both sets of planet gears are in mesh with annulus gears integral with the hub member. The dimensions of the first and second planet gears are the same as also are the dimensions of the two internal flanges affording the first and second annulus gears and this means that the first and second planet gears will in fact rotate at the same speed about their respective planet shafts. It will, however, be appreciated that this is not necessarily the case and that it will readily be possible for the two sets of planet gears to rotate at different speeds.

The embodiment of FIG. 3 is again generally similar to that of FIG. 1 but in this case the second common carrier is not connected to rotate with the hub member and the connection between the first and second gearsets is constituted by the fact the first and second common carriers are connected to rotate together and effectively constitute one single carrier 58 common to the two gearsets. As illustrated, each planet shaft 60 extends through the single carrier 58 and carries a respective first and second planet gear. This is, however, no necessary and each planet gear could be mounted on a respective planet shaft, as in the previous embodiments.

Figure 4:
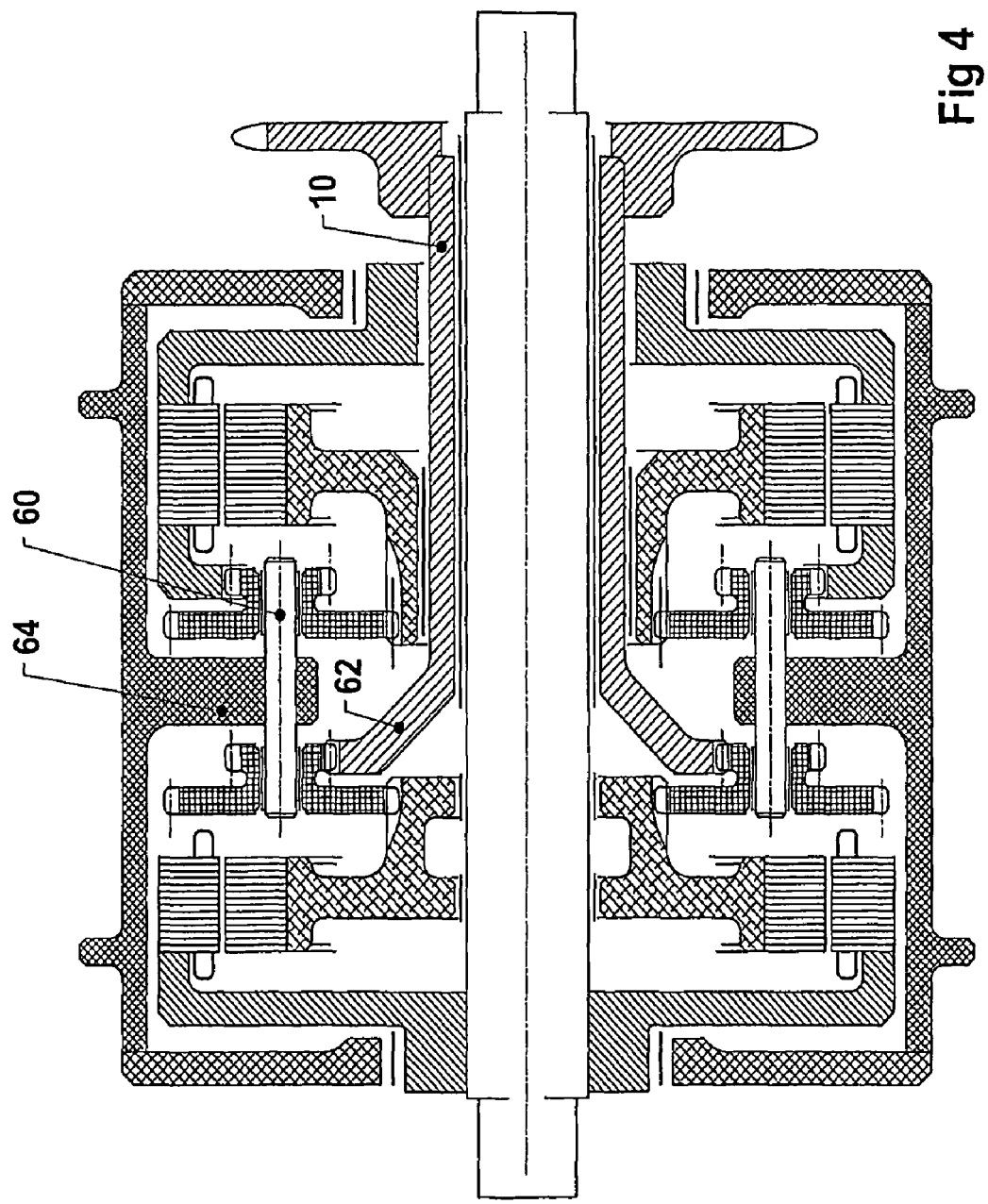
FIG. 4 is an axial sectional diagrammatic view of a fourth embodiment of this invention.

The embodiment shown in FIG. 4 differs from that in FIG. 1 in that the first planet gears are not in mesh with an annulus gear but are instead in mesh with a third sun gear 62, which is mounted to rotate about the axle 4 and is connected to the input shaft 10. In a manner similar to that shown in FIG. 3, the two common carriers are connected together and constituted by a single carrier 64, which is connected to rotate with the hub number 2. As in the embodiment of FIG. 3, each planet shaft 60 again carries a respective first and second planet gear but this is again not necessary and each planet gear could be mounted on a respective planet shaft.

In the embodiments of FIGS. 1 to 4, the motor/generators are of radial flux type, that is to say their stators are annular and concentric with the axis of the hub, whereby the flux pattern extends in the generally radial direction. Furthermore, in the preceding embodiments the central axle is solid and the input shaft rotates about it. This means in practice that the axle is likely to have to be supported at both ends and thus that the hub is suited primarily to two-wheel vehicles or to applications in which it is supported in a fork, e.g. as the front wheel hub of a three-wheel vehicle. However, in the embodiment of FIG. 5, the central axle is hollow and the input shaft rotates within it. This simple reversal renders the hub suitable for being supported on one side only, as is desirable and usual for the hubs of a motor vehicle with four or more wheels and is becoming increasingly common with certain types of bicycle and motorcycle. Furthermore, the motor/generators in this embodiment are of axial flux type.

More specifically, the sprocket wheel 8 is connected to a solid input shaft 10, which is mounted for rotation within the hollow axle 4. The input shaft 10 is connected to the carrier 24 of the first epicyclic gearset. The construction and layout of the two gearsets are substantially the same as those of the embodiment of FIG. 2. However, the carrier of the second gearset is constituted by a static support structure 66, which is connected to the axle 4 and to a rigid single arm support 68 on one side only of the hub, by means of which the hub may be supported. The support structure 66 defines an inwardly open annular space, which accommodates the radially extending permanent magnet rotor 70 of the second motor/generator. The stator of the second motor/generator constitutes two opposed annular winding arrays 72, which are situated on opposite sides of the rotor 70 on the opposed radially extending surfaces of the annular space. The support structure 66 includes a further portion, which defines a further inwardly open annular space, which accommodates the radially extending permanent magnet rotor 80 of the first motor/generator. Situated on each side of this rotor on the two radially extending surfaces of the second annular space are opposed annular winding arrays 82, constituting the stator of the first motor/generator. It will be appreciated that the arrangement of the annular stator winding arrays 72, 82 will result in the flux produced by them being axially orientated, rather than radially orientated, as in the preceding embodiments. This embodiment is particularly useful for use in an electric bicycle in which it is desired to support the hub on one side only.

Figure 5:
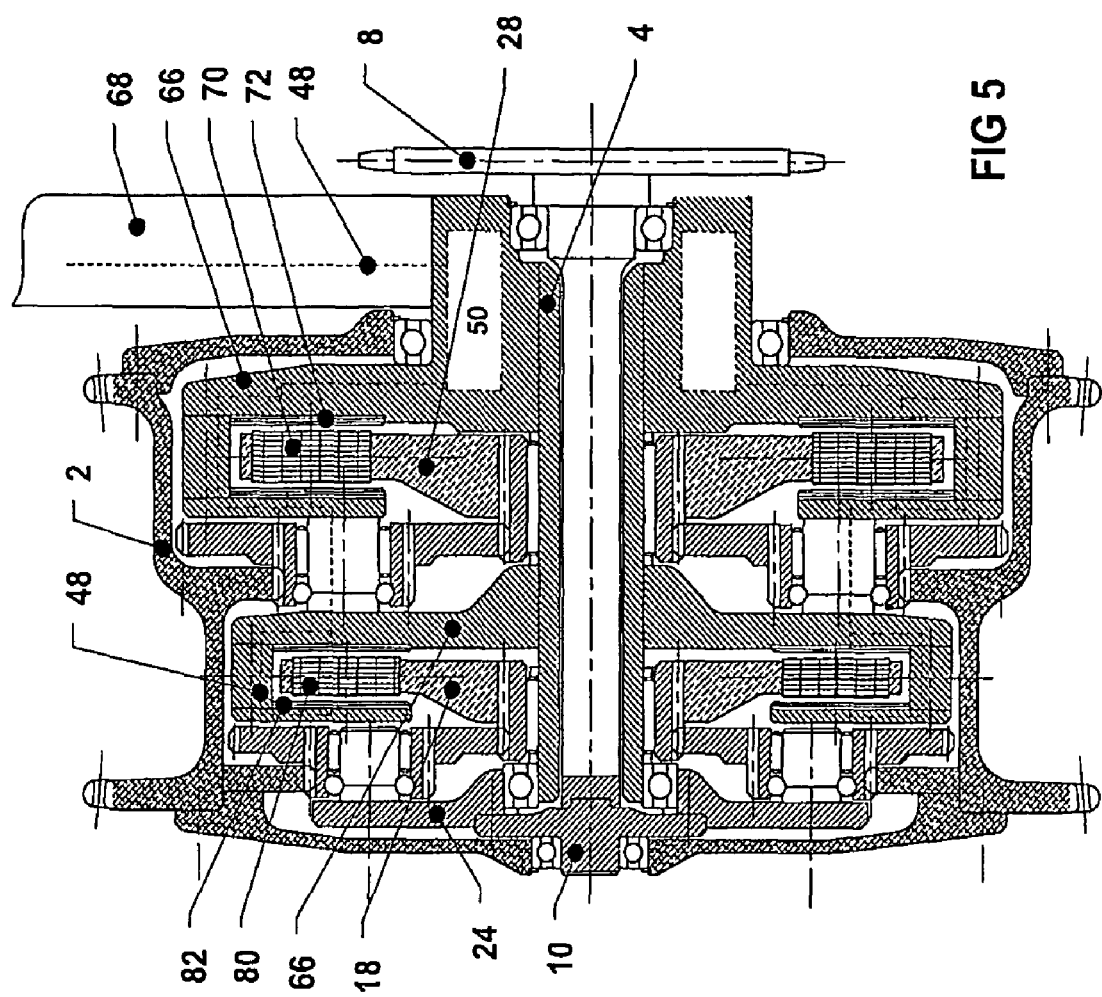
FIG. 5 is an axial sectional diagrammatic view of a fifth embodiment of this invention.
Figure 6:
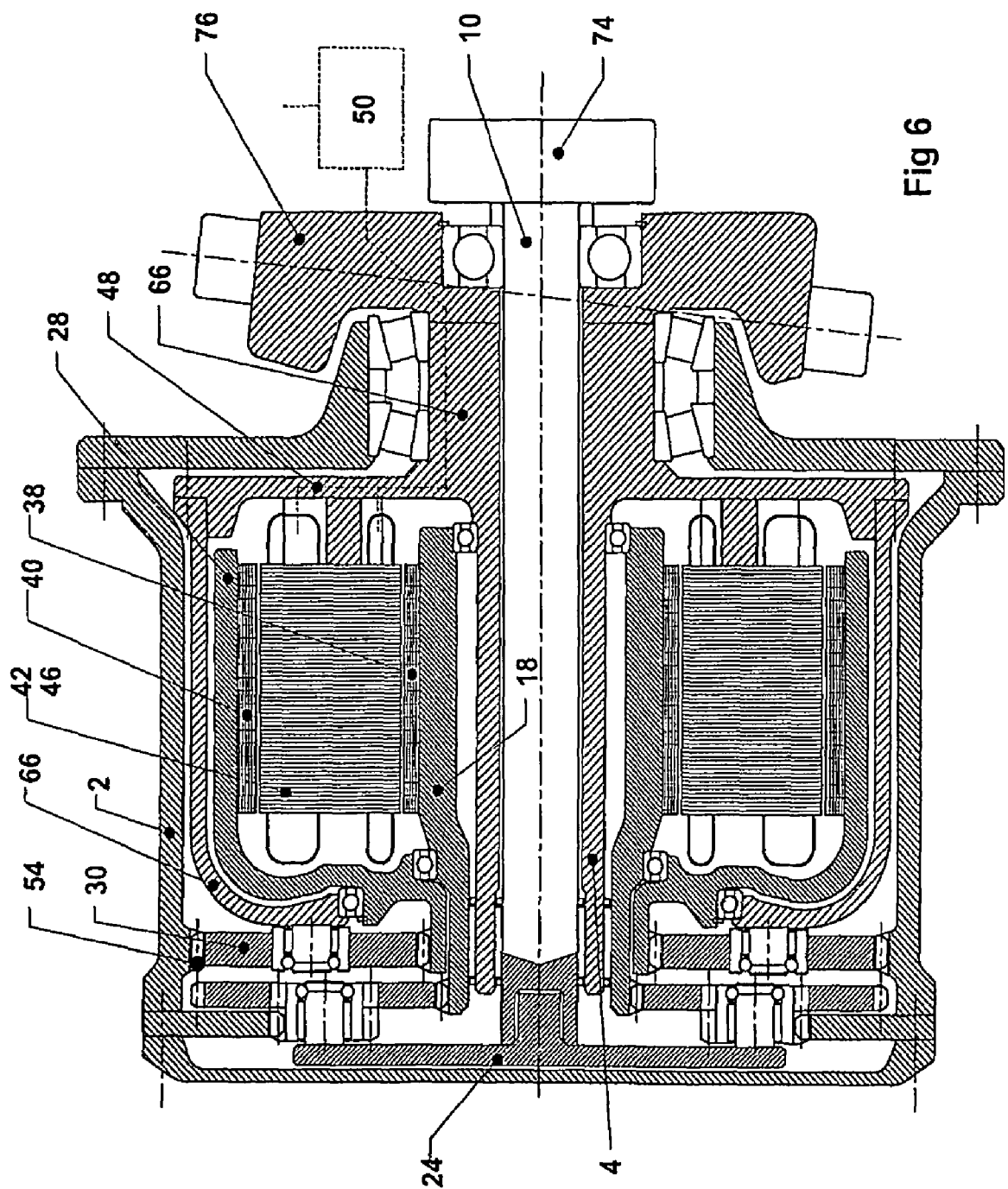
FIG. 6 is an axial sectional diagrammatic view of a sixth embodiment of this invention.

The embodiment of FIG. 6, which is particularly suitable for use in a motor vehicle having four or more wheels, is mechanically substantially the same as the embodiments of FIGS. 2 and 5, though the mechanical elements are somewhat differently shaped, primarily due to the fact that the two motor/generators are again of radial flux type and that the two stators are combined into a single stator unit. In this case, the sprocket wheel 8 is replaced by an input constant velocity joint coupling 74 for direct mechanical power input from the vehicle engine. The two sun wheels 18, 28 are of elongate, axially extending form and carry the axially extending rotors 38, 40 of the two motor/generators. The stators 42, 46 are combined into a single unit located in the annular space defined by the two rotors. The single arm support 68 of FIG. 5 is replaced by a yoke/kingpin support assembly 76 of the type commonly used in motor vehicles. The only other difference from the embodiment of FIG. 5 is that the planet wheels 30 are not of stepped type but are instead of constant diameter and afford only one set of gear teeth, which are in mesh both with the sun gear 28 and the annulus gear 54, which is connected to the hub member 2.

The invention claimed is:

1. A hub comprising a substantially cylindrical, hollow hub member, which is mounted to rotate about its axis and accommodated in whose interior is a transmission system having an input, which is mounted to rotate about the axis, and an output connected to rotate with the hub member, the transmission system comprising first and second epicyclic gearsets, the first gearset comprising a first sun gear which is mounted to rotate about the axis and is in mesh with a plurality of first planet gears mounted to rotate about respective planet shafts carried by a first common carrier, which is mounted to rotate about the axis, the first planet gears being in mesh with a further gear element, the second gearset comprising a second sun gear, which is mounted to rotate about the axis and is in mesh with a plurality of second planet gears mounted to rotate about respective planets shafts carried by a second common carrier, the second planet gears being in mesh with a second annulus gear, the first planet gears or the first common carrier being connected to rotate in synchronism with the second planet gears or the second common carrier, the first and second sun gears being connected to the rotors of first and second reversible machines, respectively, arranged to produce power or to act as motors, the power connections of the two stators being connected via a controller arranged to control the transmission of power from one machine to the other.

2. A hub as claimed in claim 1 including a stationary axle and the input comprises a hollow shaft extending around the axle.

3. A hub as claimed in claim 2, in which the input is connected to rotate with the first common carrier.

4. A hub as claimed in claim 1 including a stationary axle comprising a hollow shaft extending around the input, the axle being connected at one end only to a support member by which the hub may be supported.

5. A hub as claimed in claim 4, in which the input is connected to rotate with the first common carrier.

6. A hub as claimed in claim 1, in which the input is connected to rotate with the first common carrier.

7. A hub as claimed in claim 6, in which the further gear element is a first annulus gear connected to rotate with the hub member.

8. A hub as claimed in claim 7, in which the second common carrier is connected to rotate with the hub member.

9. A hub as claimed in claim 7, in which the second annulus gear is connected to rotate with the hub member.

10. A hub as claimed in claim 6, in which the first and second common carriers are connected to rotate together.

11. A hub as claimed in claim 6, in which the second annulus gear is stationary.

12. A hub as claimed in claim 1, in which the further gear element is a third sun gear, which is mounted to rotate about the axis and is connected to rotate with the input.

13. A hub as claimed in claim 12, in which the second annulus gear is connected to rotate with the hub member.

14. A hub as claimed in claim 1, in which the gears of at least one of the pluralities of the planet gears are stepped gears consisting of two connected portions of different diameter, both of which carry teeth and one which is in mesh with the associated sun gear and the other of which is in mesh with the associated annulus gear or third sun gear.

15. A hub as claimed in claim 1, in which the reversible machines are electric motor/generators.

16. A hub as claimed in claim 15, in which the stators of the two motor/generators are integrated to form a single stator unit.

17. A hub as claimed in claim 1 which is a hub for a vehicle wheel.

18. A hub as claimed in claim 17, in which the controller is also connected to a battery and is arranged to control the flow of electric power between the two motor/generators and the battery.

* * * * *